(12) United States Patent
Kobayashi et al.

(10) Patent No.: US 11,321,196 B1
(45) Date of Patent: May 3, 2022

(54) DISASTER RECOVERY COLLABORATED WITH STORAGE SYSTEM AND BACKUP APPLIANCE IN HYBRID CLOUD ENVIRONMENT

(71) Applicant: Hitachi, Ltd., Tokyo (JP)

(72) Inventors: Miho Kobayashi, San Jose, CA (US); Tomohiro Kawaguchi, Santa Clara, CA (US); Akiyoshi Tsuchiya, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/168,964

(22) Filed: Feb. 5, 2021

(51) Int. Cl.
*G06F 11/00* (2006.01)
*G06F 11/14* (2006.01)

(52) U.S. Cl.
CPC .......... *G06F 11/1484* (2013.01); *G06F 11/00* (2013.01); *G06F 11/1461* (2013.01); *G06F 11/1464* (2013.01); *G06F 11/1469* (2013.01); *G06F 2201/84* (2013.01)

(58) Field of Classification Search
CPC ............. G06F 11/1484; G06F 11/1464; G06F 11/1461; G06F 11/1469; G06F 2201/84

USPC .......................................................... 714/6.3
See application file for complete search history.

(56) References Cited

U.S. PATENT DOCUMENTS

| | | | |
|---|---|---|---|
| 7,152,078 B2 | 12/2006 | Yamagami | |
| 8,332,689 B2 | 12/2012 | Timashev et al. | |
| 2017/0097776 A1 | 4/2017 | Vasilyev et al. | |
| 2018/0198707 A1* | 7/2018 | Neychev | H04L 67/10 |
| 2020/0351347 A1* | 11/2020 | Chang | G06F 9/45558 |
| 2020/0409797 A1* | 12/2020 | Mathew | G06F 3/0664 |

* cited by examiner

*Primary Examiner* — Yair Leibovich
(74) *Attorney, Agent, or Firm* — Procopio, Cory, Hargreaves & Savitch LLP

(57) ABSTRACT

Example implementations described herein are directed to backup and restore of a public cloud and data center for disaster recovery. In a backup process of the disaster recovery, the VM root device information (a public cloud) and storage system volume information (a data center) in a main site are transferred to the disaster recovery tool. In a restoration process, the DR Tool specifies the storage system volume for backup to attach the VM in a backup site with the above information.

13 Claims, 13 Drawing Sheets

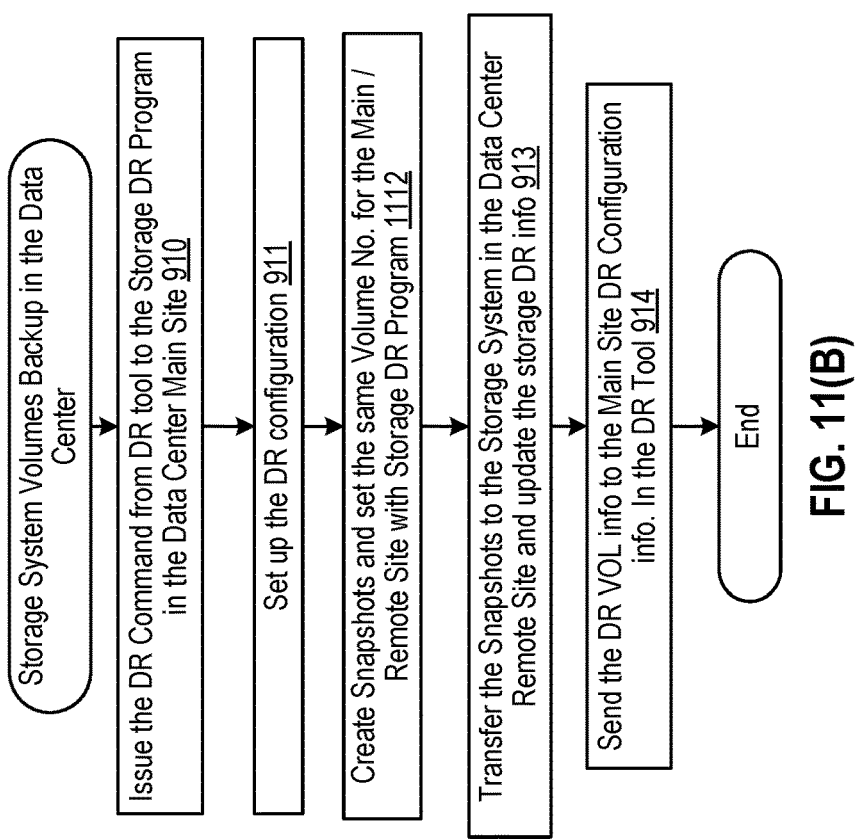
FIG. 11(A)
FIG. 11(B)
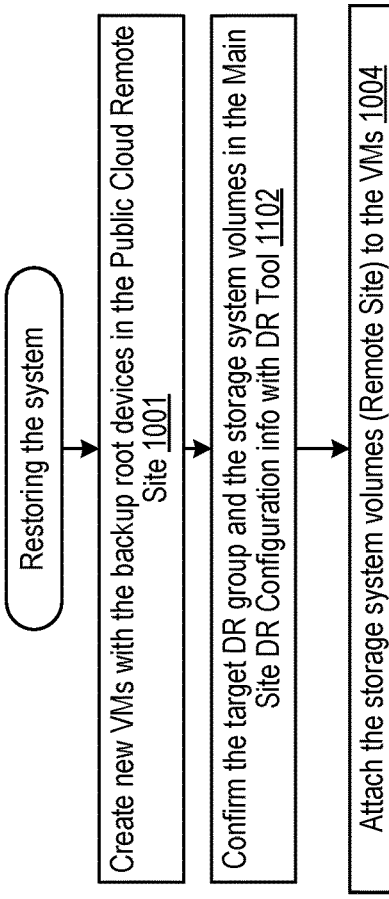
FIG. 11(C)

DISASTER RECOVERY COLLABORATED WITH STORAGE SYSTEM AND BACKUP APPLIANCE IN HYBRID CLOUD ENVIRONMENT

BACKGROUND

Field

The present disclosure is generally directed to disaster recovery systems, and more specifically, to disaster recovery in hybrid cloud environments.

Related Art

The demand for Information Technology (IT) infrastructure flexibility is increasing the number of companies using public clouds. However, the companies have sensitive data which is kept in their own data centers. Therefore, one of the related art IT environments utilize a mix of on-premise (on-prem) and public cloud, which is called a hybrid cloud.

Some companies want to use modern applications/compute services provided by public cloud vendors. Thus, one type of related art hybrid cloud architectures is that a storage system volume, as set in a physical data center, are attached to a virtual machine (VM) created in a public cloud. Some users use a colocation service (e.g., purchasing storage system areas or machines you want to use, such as a pay-as-you-go payment system) as a private cloud in a physical data center to set up this system architecture. This service is provided by a service provider and a storage system vendor. If used, the cost of managing data centers and use storage systems can be adjusted easily and flexibly, like a public cloud service.

Colocation data center can be physically located near a public cloud datacenter and connected via a high-speed network. Thus, the colocation data center can be useful for users for setting up a VM and a user data volume in separate locations because of internal data governance.

As IT usage has increased, Disaster Recover (DR) demand has also increased. DR is the method for a business continuity and protecting the IT systems from a disaster. This transfers backup data from a main site to a remote site, then restores the IT system in the remote site once the main site has a problem. In a hybrid cloud environment, the DR is also one of the important use cases.

SUMMARY

To establish the DR technique in the hybrid cloud configuration described in the background (e.g., a storage system volume in a Data Center is attached to a VM in a Public Cloud), a VM root device creates snapshots and storage system volumes snapshots as a data backup and transfers them from the main site to the remote site. In the related art implementations for recovery in the remote site, new VMs can be created with the backup root device wherein the backup storage system volume is attached to the VM.

In a related art implementation, there can be VM snapshots created with a public cloud snapshot service. However, such a related art snapshot service can only cover the devices created by the public cloud service, because the public cloud vendor cannot guarantee devices of other vendors. Therefore, the storage system volumes backup cannot be created at the same time as a VM backup.

In another related art implementation, backup data is transferred from the Data Center to the public cloud in the Main Site. However, some users do not want to store their whole data sets in the public cloud because of their internal data governance. Therefore, such related art implementations are unsuitable for the Hybrid Cloud environment.

In another related art implementation, creation of backup and restore for the storage system volumes is conducted because related art DR functions cannot cover VM layers. Therefore, such related art implementations are unsuitable for the Hybrid Cloud environment.

Aspects of the present disclosure can involve a method for facilitating backup and restore between a first site and a second site, the method including transmitting, from the first site, virtual machine snapshots of a first cloud-based site and a virtual machine configuration information of the first cloud-based site to a second cloud-based site of the second site; and transmitting, from the first site, storage volumes of a first storage system of the first site and storage system configuration information of the first storage system of the first site to a second storage system of the second site.

Aspects of the present disclosure can involve a computer program storing instructions for facilitating backup and restore between a first site and a second site, the instructions including transmitting, from the first site, virtual machine snapshots of a first cloud-based site and a virtual machine configuration information of the first cloud-based site to a second cloud-based site of the second site; and transmitting, from the first site, storage volumes of a first storage system of the first site and storage system configuration information of the first storage system of the first site to a second storage system of the second site. The computer program may be stored on a non-transitory computer readable medium, from which the instructions may be executed by one or more processors.

Aspects of the present disclosure can involve a system for facilitating backup and restore between a first site and a second site, the system including means for transmitting, from the first site, virtual machine snapshots of a first cloud-based site and a virtual machine configuration information of the first cloud-based site to a second cloud-based site of the second site; and means for transmitting, from the first site, storage volumes of a first storage system of the first site and storage system configuration information of the first storage system of the first site to a second storage system of the second site.

Aspects of the present disclosure can involve an apparatus for facilitating backup and restore between a first site and a second site, the apparatus including a processor, configured to transmit, from the first site, virtual machine snapshots of a first cloud-based site and a virtual machine configuration information of the first cloud-based site to a second cloud-based site of the second site; and transmit, from the first site, storage volumes of a first storage system of the first site and storage system configuration information of the first storage system of the first site to a second storage system of the second site.

BRIEF DESCRIPTION OF DRAWINGS

FIGS. 11(A) to 11(C) illustrate example processing for the system backup and restoring through a storage system serial number, in accordance with an example implementation.

DETAILED DESCRIPTION

Figure 1:
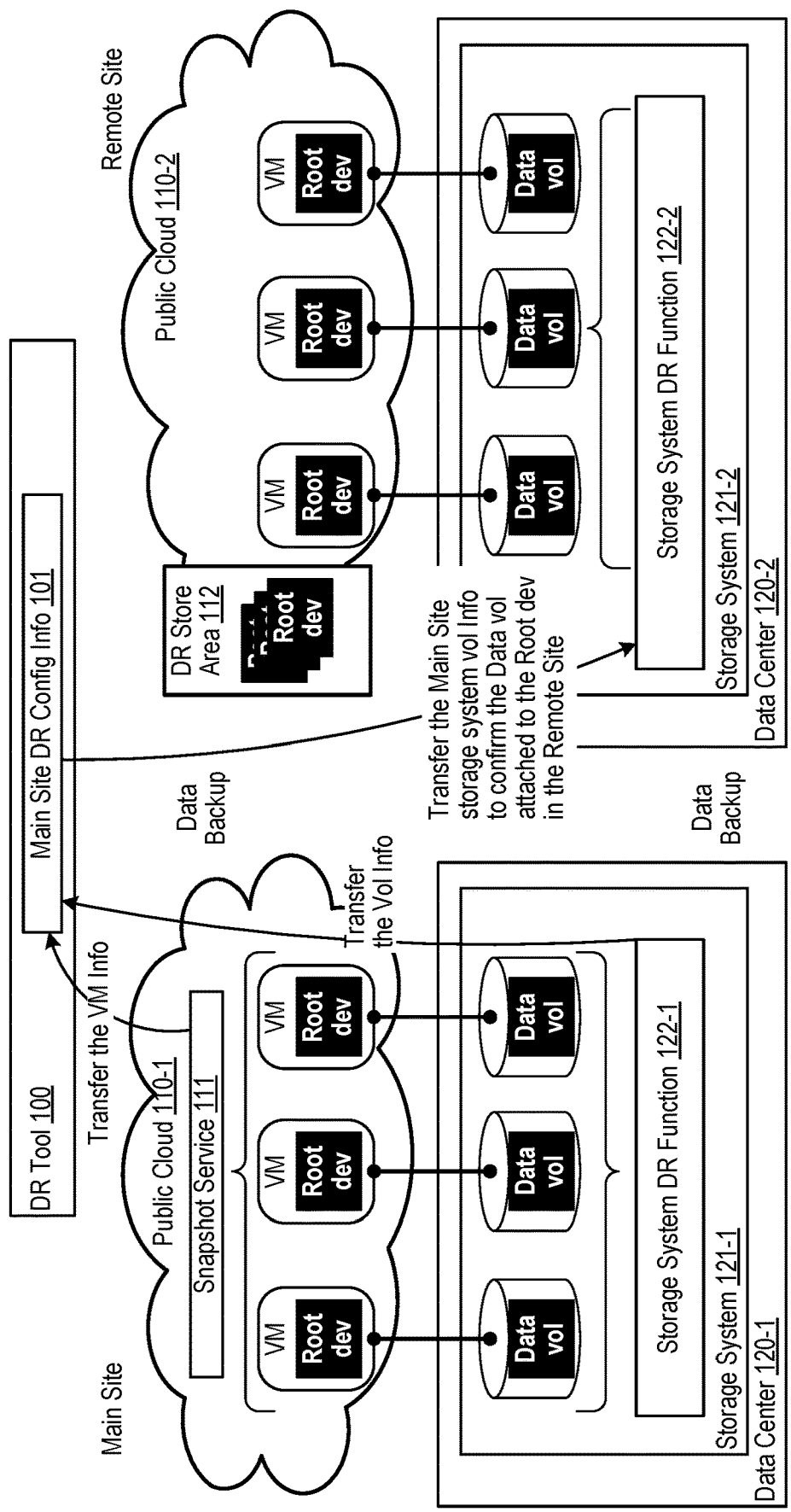
FIG. 1 illustrates an example logical architecture involving a main site and a remote site, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations involve a main site facilitated as a cloud-based site and a remote site facilitated as a cloud-based site. The following example implementations are described with respect to the main site being a public cloud and the remote site being another public cloud or another cloud implemented nearby the main site. However, the present disclosure is not limited thereto, and other cloud-based sites may also be utilized in accordance with the desired implementation. For example, the main site can be facilitated as a private cloud site and the remote site can be facilitated as an internal data center.

FIG. 1 illustrates an example logical architecture involving a main site and a remote site, in accordance with an example implementation. In a first example implementation there are DR Tool commands in the DR Tool 100 which creates backup VM root devices and backup storage system volumes in the public cloud 110-1 and data center 120-1 of the main site, updates the main site DR configuration information 101 with the VM information transferred from the snapshot service 111 of the public cloud 110-1 and volume information transferred from the storage system DR function 122-1 of the corresponding storage system 121-1, and restores the information in the remote site with the main site DR configuration information 101. That is, the main site DR configuration information 101 is transferred to the storage system DR function 122-2 of the corresponding storage system 121-2 of the remote site, which will be used to confirm the data volumes attached to the root device information in the storage system 121-2 of the remote site. The data volumes are thereby provided to the public cloud 110-2 of the remote site and the corresponding root device information is provided to the DR storage area 112.

Thus as illustrated in FIG. 1, during the backup operation of the DR, the VM root device information (a public cloud) and storage system volume information (a data center) in a main site are transferred to the DR Tool 100. The virtual machine snapshots of the public cloud along with their virtual machine configuration are thereby transmitted to the public cloud of the remote site, and the storage volumes along with the storage system configuration information of the data center of the main site are transmitted to the data center of the remote site.

In a system restoration operation, the DR Tool 100 transfers the main site storage system volume information to confirm the data volume attached to the root device in the remote site. Then, the DR Tool 100 attaches the data volume to the VM to recover the system. Thus, when restoration occurs, the public cloud of the remote site generates backup virtual machines from the transmitted virtual machine snapshots according to the virtual machine configuration received from the main site, and the backup storage volumes are generated at the storage system of the data center at the remote cite according to the storage system configuration information received from the main site.

Figure 2:
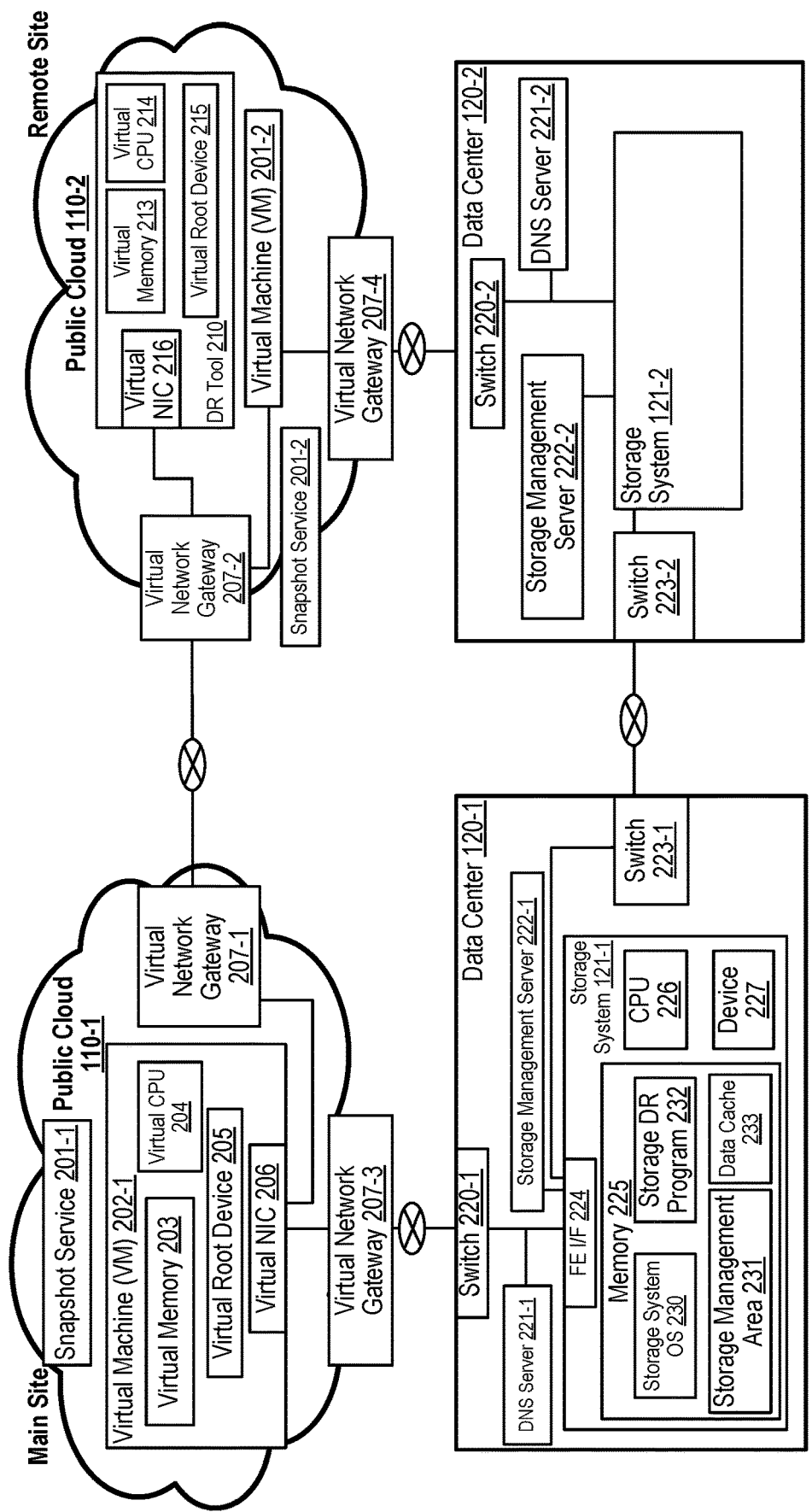
FIG. 2 illustrates an example system architecture, in accordance with an example implementation.

FIG. 2 illustrates an example system architecture, in accordance with an example implementation. This illustrates an example of a logical configuration of the system in which the method and apparatus of the example implementations may be applied.

In an example implementation, each of the public clouds 110-1, 110-2 have their own corresponding snapshot service 201-1, 201-2, VM 202-1, 202-2, virtual network gateway 207-1, 207-2 for facilitating communications between the public clouds, and virtual network gateway 207-3, 207-4 for facilitating connections to their respective data centers 120-1, 120-2. Each VM, as illustrated in VM 202-1, can involve a virtual memory 203, virtual central processing unit (CPU) 204, virtual root device 205, and virtual Network Interface Card (NIC) 206 to communicate with a corresponding gateway.

Additionally, the DR Tool 210 may be located in both or either one of the public clouds 110-1, 110-2 of the main site and the remote site to protect the DR management information, or can be placed in the data center, established in a physical server/a virtual machine/a container or may be offered as a Software as a Service (SaaS), depending on the desired implementation. The DR Tool 210 can involve a corresponding virtual memory 213, virtual CPU 214, virtual root device 215, and virtual NIC 216 to communicate with the corresponding gateway.

Data Centers 120-1, 120-2 can each have their own corresponding switch 220-1, 220-2 for facilitating communications between their respective public clouds 110-1, 110-2, switch 223-1, 223-2 for facilitating communications between each other, Domain Name Server (DNS) 221-1, 221-2, and storage management server 222-1, 222-2. Storage management server 222-1, 222-2 may be established in a physical server/a virtual machine/a container or may be offered as a Software as a Service (SaaS) depending on the desired implementation.

Each storage system, as illustrated in storage system 121-1, can involve a fast ethernet interface (FE I/F) 224, memory 225, CPU 226 and storage devices 227. Memory 225 has various functions that can be loaded and executed by CPU 226, such as the storage system operating system (OS) 230, the storage system management area 231, the storage system DR program 232, and the data cache 233.

In this example, the configuration involves private networks. Depending on the desired implementation, the DNS servers 222-1, 222-2 may need to use the hostnames to establish the connection between the Public Cloud and the Data Center.

Figure 3:
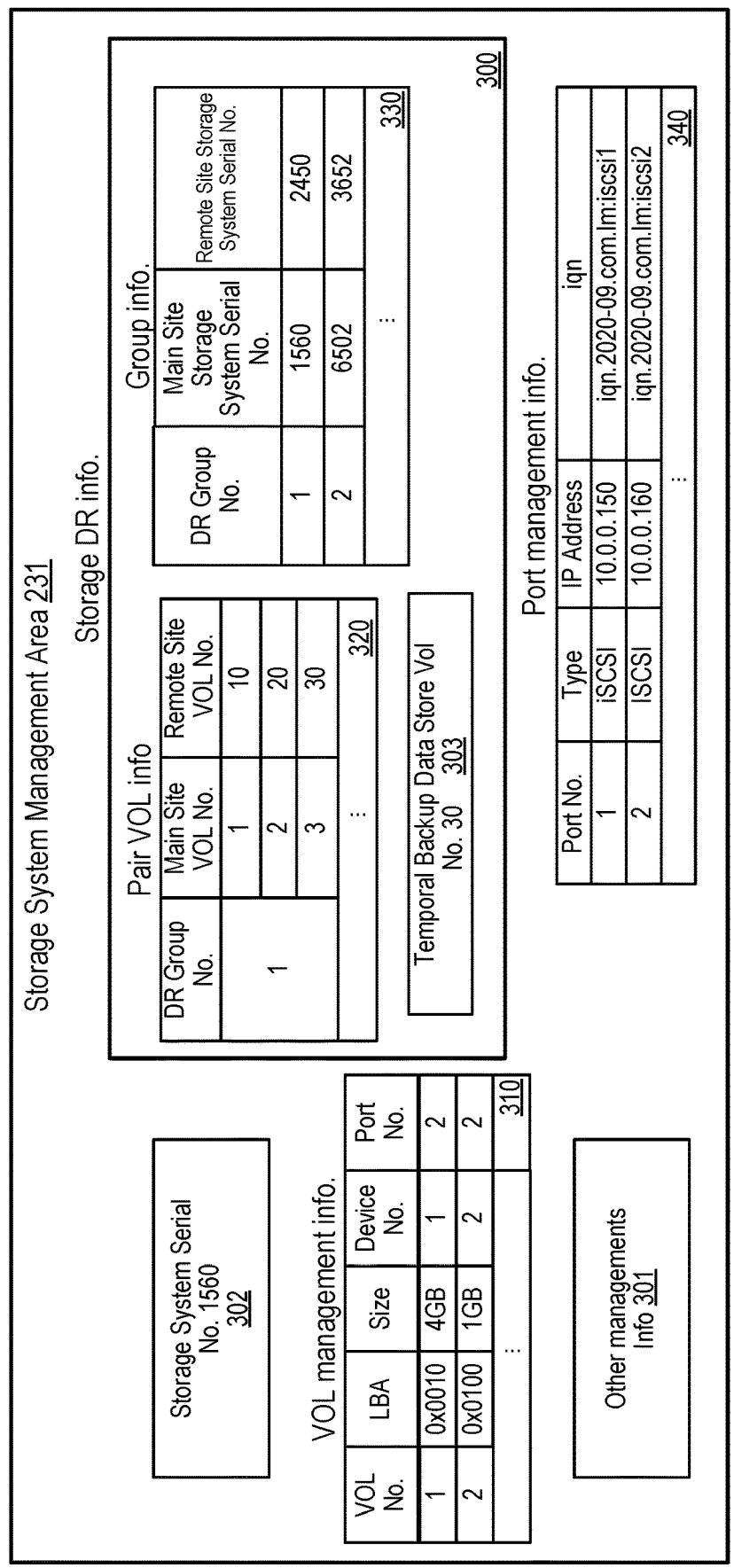
FIG. 3 illustrates an example of the management area of the memory in the storage system, in accordance with an example implementation.

FIG. 3 illustrates an example of the management area 231 of the memory in the storage system, in accordance with an example implementation. The management area 231 manages storage system configuration information such as storage system port information for access between the virtual machines and the main site, and backup volume information indicative of location of backup data as noted below. The storage DR information 300 is used by the storage system DR function to create a DR backup and to manage the relationship of the volumes relationship between the main site and the remote site. For example, the pair volume information 320 indicates the volume pair relationship for a particular DR group between the main site and the remote site, and the group information 330 indicates the serial numbers of the main site and the remote site associated with a particular DR group.

The volume management information 310 indicates the volumes managed by the storage system and their corresponding information, such as volume number, logical block address, size of the volume, device number, and port number.

The storage system serial number 302 indicates the serial number of the storage system.

The port management information 340 indicates the types of ports within the storage system. For instance, the example of FIG. 3 indicates the iSCSI ports information to connect between the VM in the Public Cloud and the storage system volumes in the Data Center. The type may be FCoE, HTTP, HTTPS and so on depending on the desired implementation. The Storage System Volumes are attached to the port to be recognize by VMs or servers.

The temporal backup data store volume number 303 is the area in which backup data is stored temporarily before transfer to the remote site.

Depending on the desired implementation, other management information 301, such as row device information, pool information, CPU information, and so on, can be incorporated for management of the storage system in accordance with the desired implementation.

Figure 4:
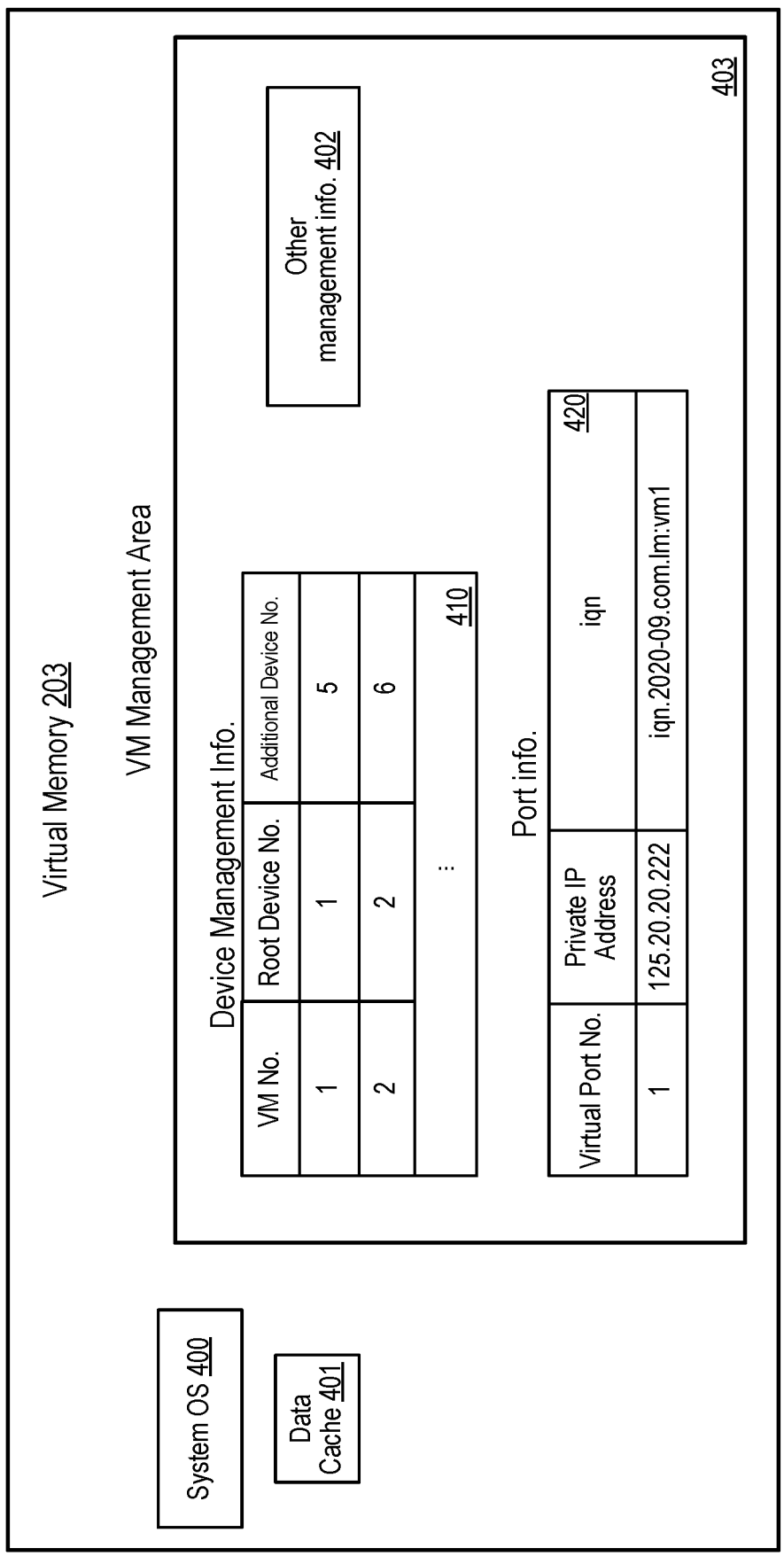
FIG. 4 illustrates an example virtual memory in a public cloud VM, in accordance with an example implementation.

FIG. 4 illustrates an example virtual memory 203 in a public cloud VM, in accordance with an example implementation. The virtual memory 203 may include a system OS 400, data cache 401, and VM management area 403 and includes virtual machine configuration information involving a mapping between virtual machines and root devices, and port information for access to the virtual machines as follows.

Device Management information 410 in VM management area 403 involves the VM information included with the root device numbers, and the additional device numbers. The additional device is indicative of the virtual device to which the public cloud service creates and attaches. Multiple additional devices can be created and attached to a VM.

The port information 420 is indicative of the VM network port information. For instance, the internet protocol (IP) address indicates the private address, and the virtual network gateway (as illustrated in FIG. 2) convert it to public IP address to facilitate access from the outside of the public cloud virtual network.

Other management information 402, such as virtual CPU information, virtual network security information and so on, can also be incorporated for management of the storage system in accordance with the desired implementation.

Figure 5:
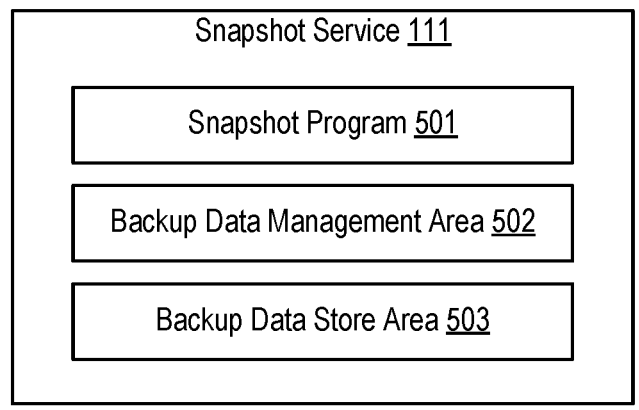
FIG. 5 illustrates an example of the snapshot service in the public cloud, in accordance with an example implementation.

FIG. 5 illustrates an example of the snapshot service 111 in the public cloud, in accordance with an example implementation. The snapshot service 111 involves the snapshot program 501, the backup data management area 502, and the backup data store area 503. Once the command for the creation of VM snapshots is executed, the snapshot program 501 creates the backup of the root devices and stores them in the backup data store area. Then the program transfers the backup to the backup data store area 503 in the remote site. The backup data management area 502 stores the info related to the backup management, such as the creation date/time, the creating backup progress percentage and so on in accordance with the desired implementation.

Figure 6:
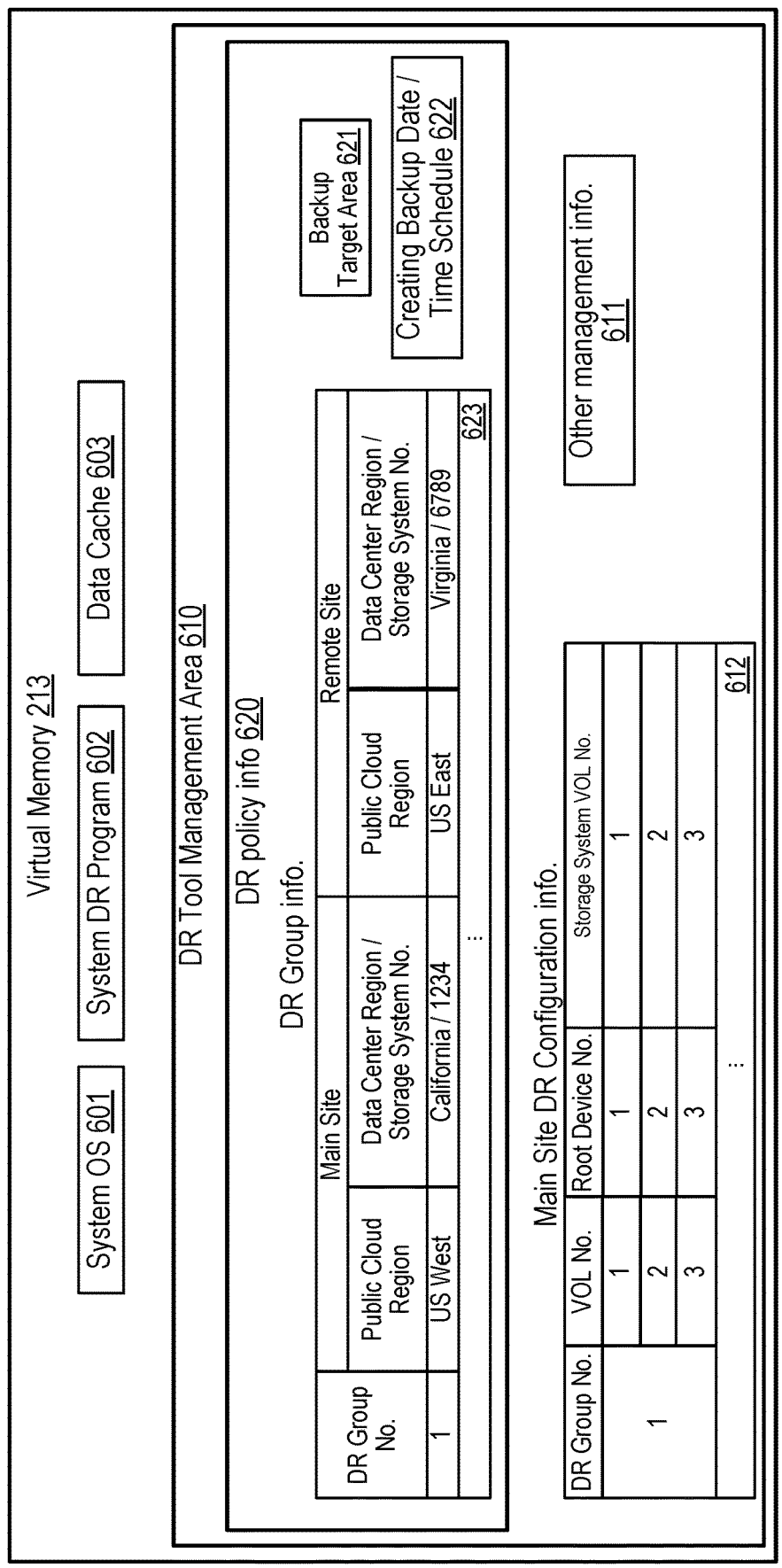
FIG. 6 illustrates an example of the virtual memory in the DR Tool, in accordance with an example implementation.

FIG. 6 illustrates an example of the virtual memory 213 in the DR Tool, in accordance with an example implementation. The virtual memory 213 can involve the system OS 601, the system DR program 602, the data cache 603, and the DR tool management area 610. The DR Tool management area 610 is used for management of the main site DR information 612. From this example implementation, the need to store extra data such as remote site data can be eliminated, thereby reducing IT costs, resources, and creation time when the DR Tool executes the creation the data backup as a part of DR.

DR policy information 620 is configured by the users, and can include the timing of backup process through a time schedule 622, backup target area 621 (e.g., a part or all of the VM), DR group information 623, and so on. The DR group can be set up in the form of a consistency group to which VM/storage volumes can be added, and the DR group information 623 indicates the location of the DR group main/remote site. Depending on the desired implementation, the storage system serial number can be discarded as users can login to the VM, find the IP address of the storage system volume, and can search the storage system number with the data center region information and the IP address in the storage management server (and DNS server). Once the DR policy is set up or updated, the main DR information 612 is also updated.

Other information 611 such as CPU information, network port information and so on, can be utilized to manage the storage system, in accordance with the desired implementation.

Figure 7:
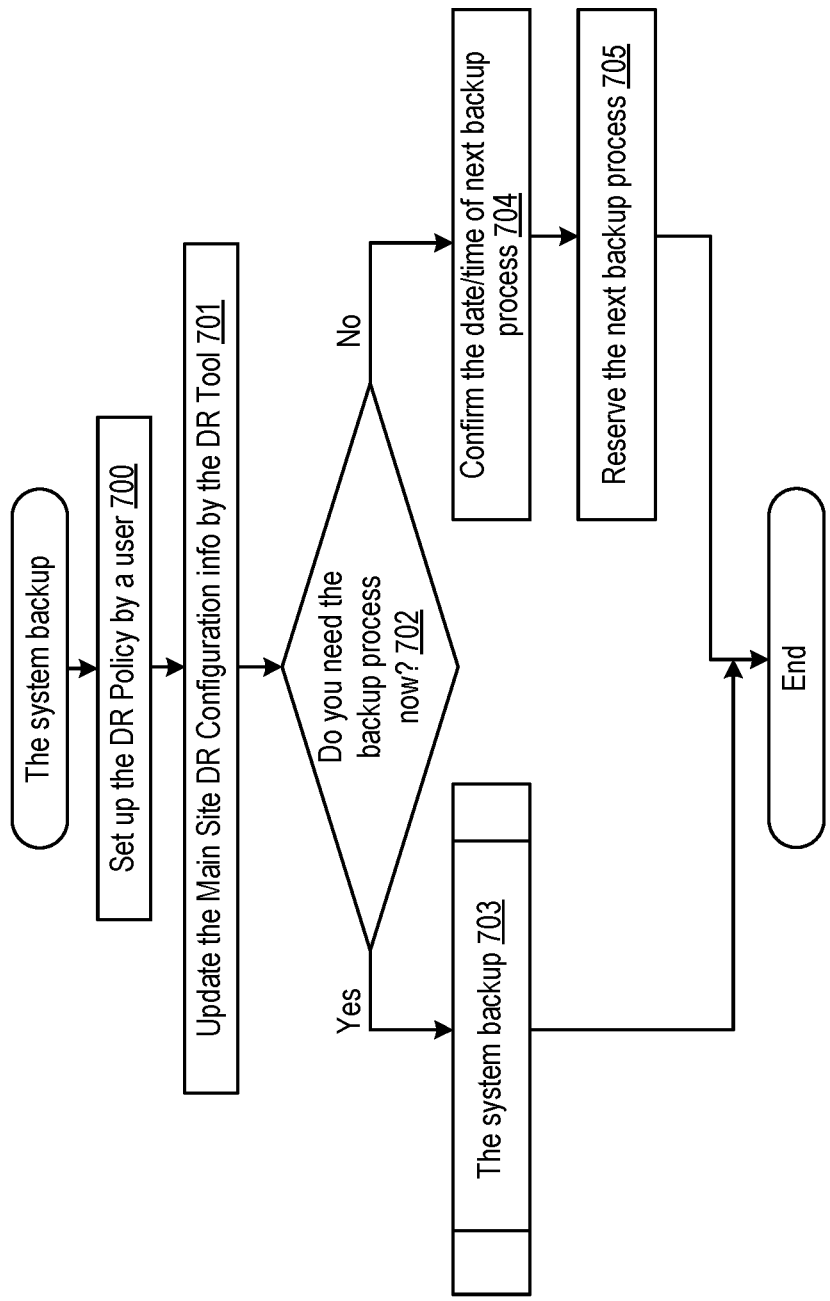
FIG. 7 illustrates a DR policy setup by a user, in accordance with an example implementation.
Figure 8:
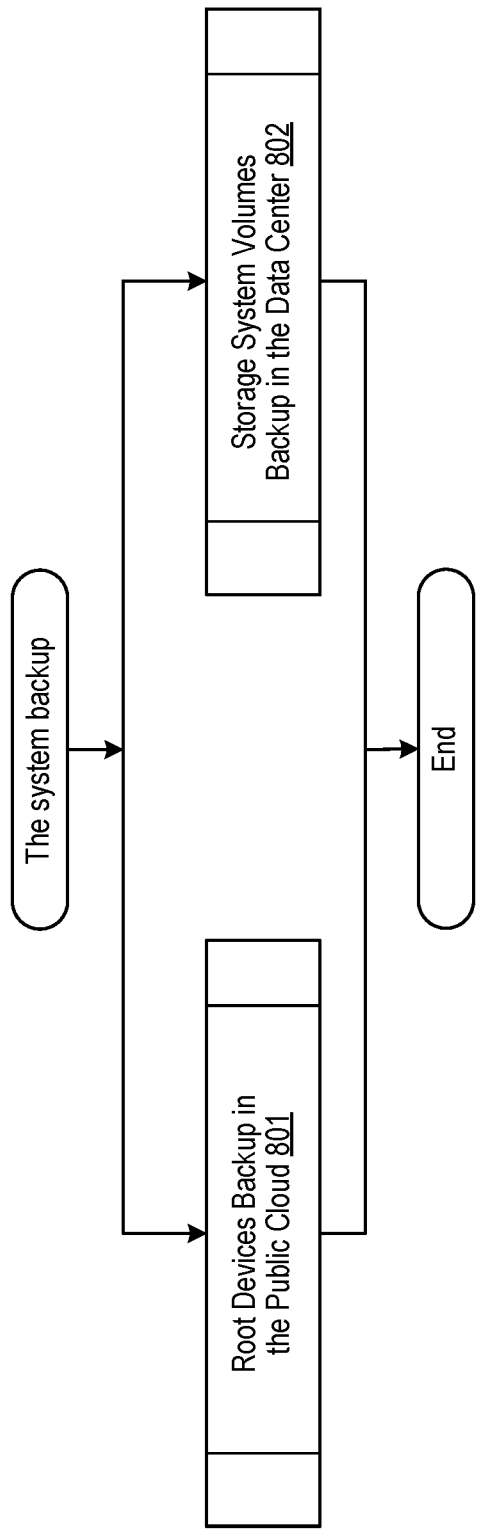
FIG. 8 illustrates an example of a system backup, in accordance with an example implementation.

FIG. 7 illustrates a DR policy setup by a user, in accordance with an example implementation. At 700, the user inputs the DR related to the DR Policy information in the DR Tool Management Area. At 701, the DR Tool searches and updates the Main Site DR Configuration information with the corresponding user input information. At 702, a decision is made as to whether a backup process is to be invoked immediately. If the user wants to do a backup process immediately (Yes), the flow proceeds to 703 wherein the system backup process described in FIG. 8 is executed. If the user does not need an immediate backup process (No), the DR Tool confirms the data/time of next backup process at 704 and reserves to schedule the next backup process at 705.

FIG. 8 illustrates an example of a system backup, in accordance with an example implementation. The DR is the combination of system backup and restoring, and the example of FIG. 8 illustrates examples of the backup process steps. When the backup process is invoked by a DR Tool, based on the policy of the user setup, the DR Tool issues the commands to the public cloud 801 and the data center 802 of the main site in parallel, as will be described in FIGS. 9(A) and 9(B).

Figure 9B:
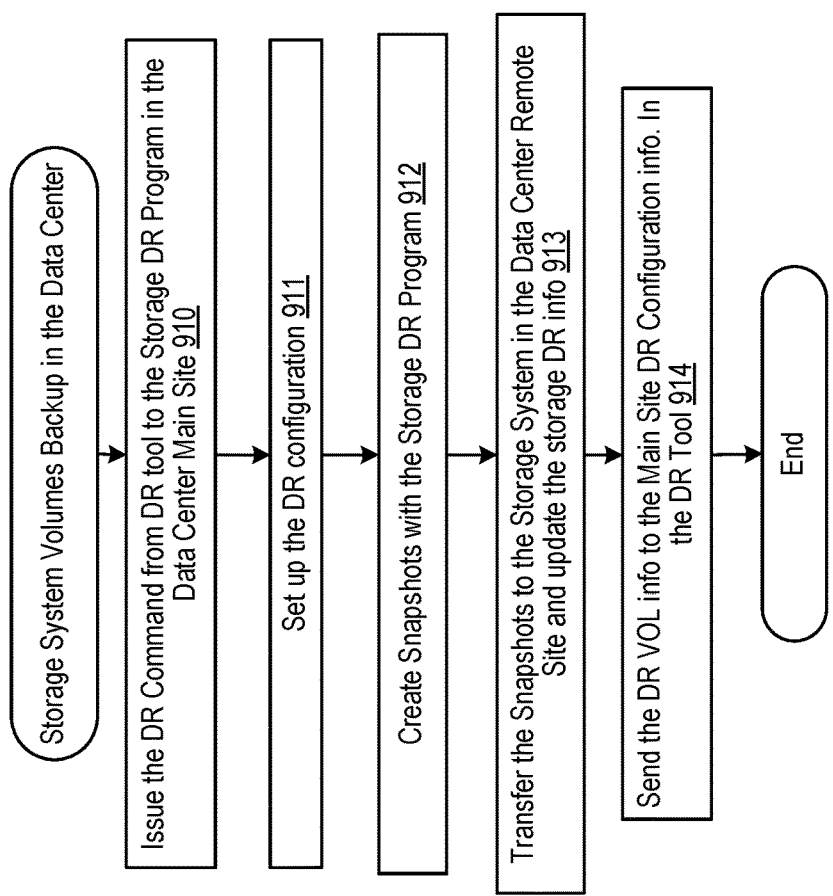
FIGS. 9(A) and 9(B) illustrate example flows of the system backup in the public cloud and the data center, in accordance with an example implementation.
Figure 9A:
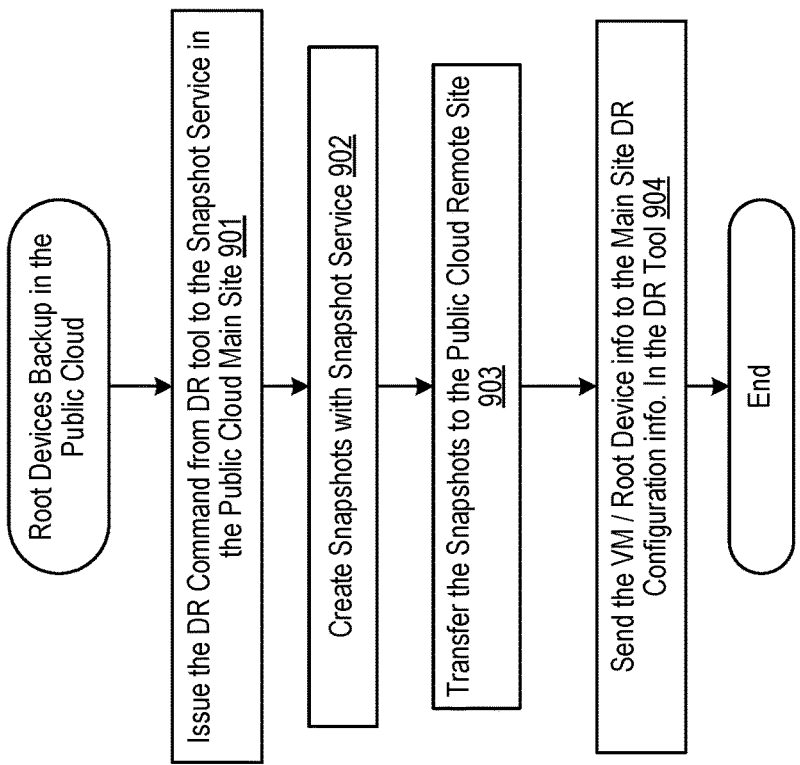

FIGS. 9(A) and 9(B) illustrate example flows of the system backup in the public cloud and the data center, in accordance with an example implementation. Specifically, FIG. 9(A) illustrates the process in the data center, and FIG. 9(B) illustrates the process in the public cloud.

With respect to the process in the public cloud as illustrated in FIG. 9(A), the DR tool issues the DR command with the DR policy information and the main site DR configuration information to the snapshot service program in the public cloud at 901, and the service creates the snapshots and stores them in the backup data store area at 902. Then, the service transfers the snapshots to the backup data storage area in the remote site at 903. After that, the snapshot service responds with a process complete status to the DR tool, wherein the DR tool requests to send the VM for DR information to the snapshot service at 904. Finally, the main site DR configuration information is updated based on the VM/root device information.

With respect to the process in the data center as illustrated in FIG. 9(B), the DR Tool issues the DR command with the DR policy information and the Main Site DR Configuration information to the storage DR program in the data center at 910, wherein the flow sets up the DR configuration at 911, updates the storage DR information, creates the snapshots at 912 and stores them in the temporal backup data store area. Then, the flow transfers the snapshots to the remote site volumes via the temporal backup data storage area in the remote site at 913. Subsequently at 914, the flow responds with the process complete status to the DR Tool, wherein the DR Tool requests to send the storage system volumes (main site) information for the DR information to the snapshot service. Finally, the main site DR configuration information is updated based on the storage system volumes information.

Figure 10:
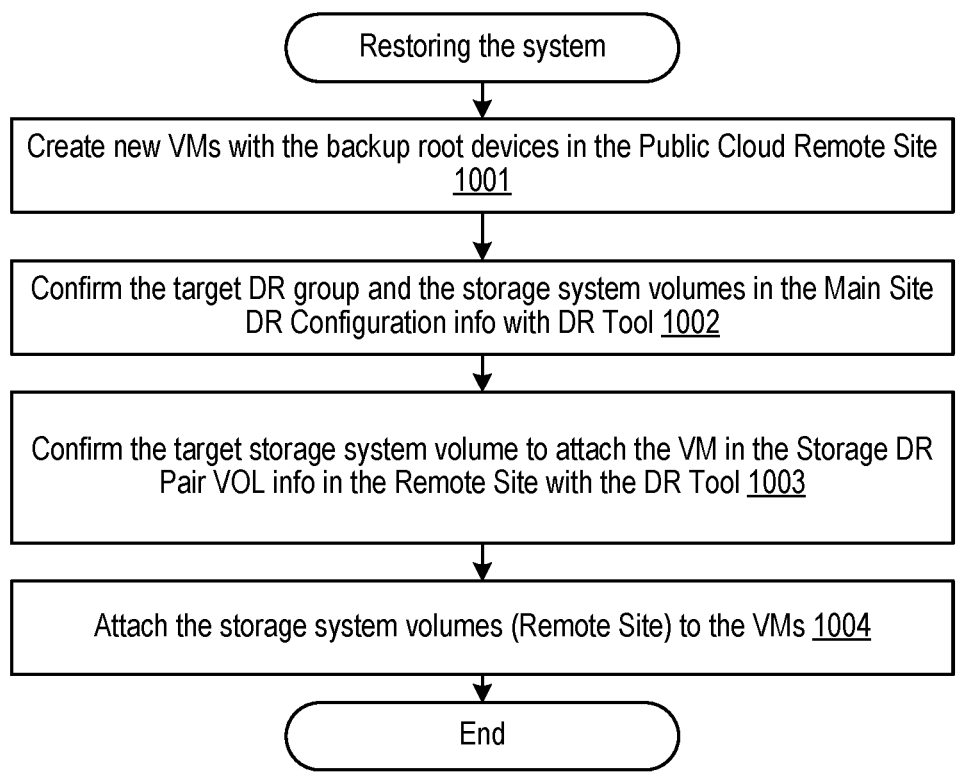
FIG. 10 illustrates an example process for restoring the system, in accordance with an example implementation.

FIG. 10 illustrates an example process for restoring the system, in accordance with an example implementation. This process occurs when the main site has a problem and a user cannot access to the main site anymore. As will be shown herein, from the information of FIG. 3 and FIG. 4, the remote public cloud site will generate backup virtual machines from the transmitted virtual machine snapshots according to the mapping and facilitating port access to the virtual machines according to the port information, and the remote data center will generate backup storage volumes from the transmitted storage volumes based on the backup volume information and facilitate port access between the main site and the remote data center according to the storage system port information. Finally, the backup virtual machines will be attached to the backup storage volumes at the remote site.

First, the DR Tool provides command instructions for creating new VMs with the backup root devices to the snapshot service of the public cloud in the remote site at 1001. At 1002, the DR Tool confirms the target DR group and the storage system volumes in the main site DR configuration information to find out which backup storage system volumes should be attached to the VM. At 1003, the DR Tool sends the above information to the storage system in the remote site and confirms the target storage system volume. Depending on the desired implementation, access to the storage system management service or service can be conducted instead of to the storage system to get the storage system configuration information included with the DR configuration.

At 1004, the DR Tool attaches the volume to the VM with storage system port information.

In a second example implementation, there is another method to determine the target storage system volumes during the restoring process. In this example implementation, the storage system serial number is used to recognize the remote site.

FIGS. 11(A) to 11(C) illustrate example processing for the system backup and restoring through a storage system serial number, in accordance with an example implementation. Specifically, FIG. 11(A) illustrates the pair vol information of the storage DR information in the storage system. In comparison to FIG. 3, the volume number is set up because the same volume numbers are named to the Main Site volume and the Remote Site volume.

FIG. 11(B) illustrates the example backup process in the data center, in accordance with an example implementation. The flow is similar to FIG. 9(B), except that the flow at 1112 is different: snapshots are created and set with the same volume numbers for the Main/Remote Site with the storage DR program.

FIG. 11(C) illustrates the process of restoring the system, in accordance with an example implementation. In comparison to FIG. 10, the target volumes are determined at 1102 as illustrated in FIG. 11(C), thus the flow of 1003 in FIG. 10 can be skipped.

In a third example implementation, there can be another method of attaching the storage system volumes to the VMs during the restoring process.

Figures 12A, 12B:
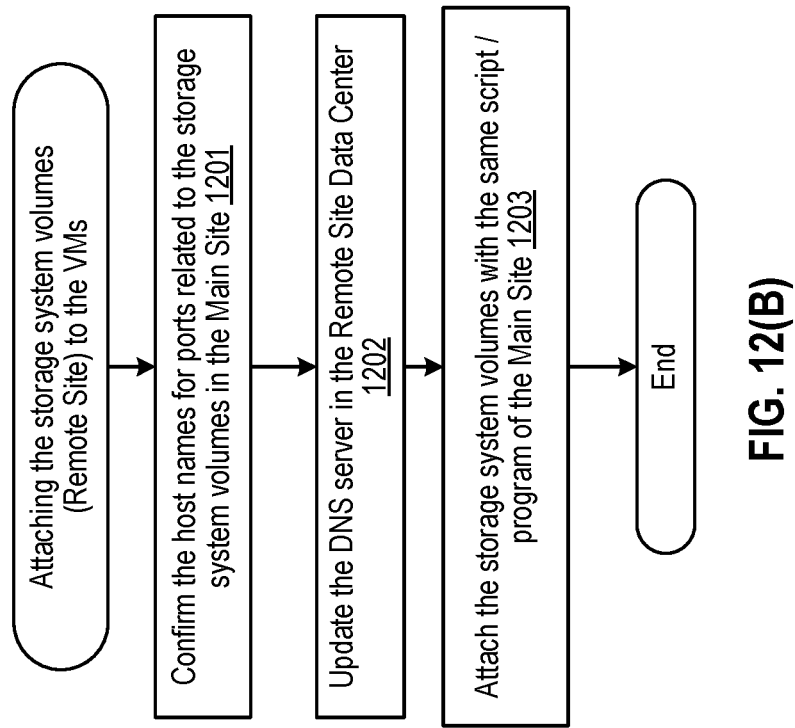
FIGS. 12(A) and 12(B) illustrate an example of attaching the volume to VMs in the backup site, in accordance with an example implementation.

FIGS. 12(A) and 12(B) illustrate an example of attaching the volume to VMs in the backup site, in accordance with an example implementation. Specifically, FIG. 12 (A) shows the main site DR configuration information in DR tool management area. In comparison to FIG. 6, the "host name for port" is added in the table.

FIG. 12 (B) illustrates an example process of attaching the volumes to VMs in the restoring process, in accordance with an example implementation. At first, the flow confirms the host names for ports related to the storage system volumes in the main site at 1201.

In related implementations, the remote site IP address or hostname and IQN information can be used to attach the volumes to the new VMs. Thus, the attaching volumes command scripts/programs used in the main site are modified. In this example implementation, the DNS server in the remote data center is updated to set up the same hostnames of the main site at 1202. Then, at 1203, the same hostname is used to attach the volume so that the scripts/programs do not need to be modified. Thus, the DNS server provides a hostname to the main site, and the attaching the backup virtual machines to the backup storage volumes of the remote site is conducted through the provided hostname.

The example implementations therefore facilitate a method of a DR solution in hybrid cloud environments, which allows users to create backup a whole system and recover the same configurations in a remote site with a public cloud backup service and a storage system DR function.

The example implementations allow users to establish the IT system with both public clouds and private clouds in a colocation data center. However, the example implementations can also be applied to other environments, such as a public cloud+traditional on-prem in a data center, a colocation service+on-prem and so on. Users can confirm that this solution is set in the user manual and the dashboard which shows DR configurations, DR policies and so on.

Figure 13:
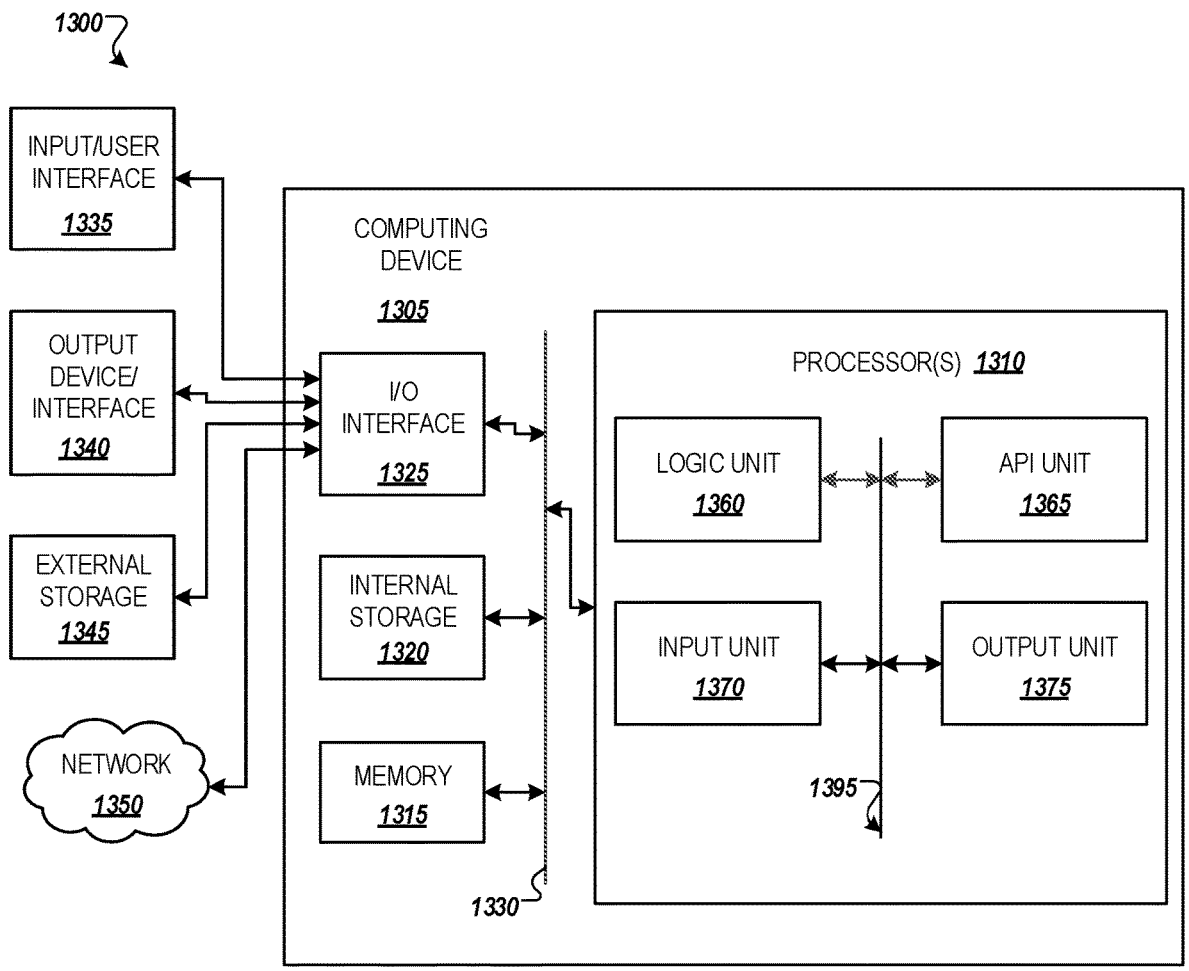
FIG. 13 illustrates an example computing environment with an example computer device suitable for use in some example implementations.

FIG. 13 illustrates an example computing environment with an example computer device suitable for use in some example implementations, such as a DR tool facilitating backup and restore between a first site and a second site (e.g., main site/remote site), as implemented by a storage system or a virtual machine as illustrated in FIG. 1 and FIG. 2.

Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

Processor(s) 1310 can be configured to transmit, from the first site, virtual machine snapshots of a first cloud-based site and a virtual machine configuration information of the first cloud-based site to a second cloud-based site of the second site; and transmit, from the first site, storage volumes of a first storage system of the first site and storage system configuration information of the first storage system of the first site to a second storage system of the second site as illustrated in FIGS. 1-8.

For restoration of the first site, processor(s) 1310 can be configured to generate, at the second cloud-based site, backup virtual machines from the transmitted virtual machine snapshots according to the virtual machine configuration information received from the first site; and generate, at the second storage system, backup storage volumes from the transmitted storage volumes according to the storage system configuration information from the first site as illustrated in FIG. 10. As illustrated in FIG. 10, processor(s) 1310 can be configured to attach the backup virtual machines to the backup storage volumes at the second storage system.

Processor(s) 1310 can be further configured to provide a hostname from a domain name server to the first site, wherein the attaching the backup virtual machines to the backup storage volumes of the second storage system comprises is conducted through the provided hostname as illustrated in FIGS. 12(A) and 12(B).

Processor(s) 1310 can be configured to, for a request to restore from the second site to the first site, generate, at the second cloud-based site, backup virtual machines from the transmitted virtual machine snapshots according to the mapping and facilitating port access to the virtual machines according to the port information; generate, at the second storage system, backup storage volumes from the transmitted storage volumes based on the backup volume information and facilitating port access between the first site and the second storage system according to the storage system port information; and attach the backup virtual machines to the backup storage volumes at the second storage system as illustrated in FIGS. 3, 4, and 10.

Processor(s) 1310 can be configured to refer to a storage system serial number associated with a disaster recovery group of the first storage system to identify the second storage system at the second site, wherein the transmitting, from the first site, storage volumes of a first storage system of the first site and storage system configuration information of the first storage system of the first site is to the identified second storage system of the second site as illustrated in FIGS. 11(A) to 11(C).

As illustrated in FIGS. 3 and 4, the virtual machine configuration information can involve a mapping between virtual machines and root devices, and port information for access to the virtual machines, wherein the storage system configuration information can also involve storage system port information for access between the virtual machines and the first site, and backup volume information indicative of location of backup data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for facilitating backup and restore between a first site and a second site, the method comprising:
   transmitting, from the first site, virtual machine snapshots of a first cloud-based site and a virtual machine configuration information of the first cloud-based site to a second cloud-based site of the second site;
   transmitting, from the first site, storage volumes of a first storage system of the first site and storage system configuration information of the first storage system of the first site to a second storage system of the second site; and for restoration of the first site:
  generating, at the second cloud-based site, backup virtual machines from the transmitted virtual machine snapshots according to the virtual machine configuration information received from the first site; and
  generating, at the second storage system, backup storage volumes from the transmitted storage volumes according to the storage system configuration information from the first site.

2. The method of claim 1, further comprising attaching the backup virtual machines to the backup storage volumes at the second storage system.

3. The method of claim 2, further comprising providing a hostname from a domain name server to the first site, wherein the attaching the backup virtual machines to the backup storage volumes of the second storage system is conducted through the provided hostname.

4. The method of claim 1, wherein the virtual machine configuration information comprises a mapping between virtual machines and root devices, and port information for access to the virtual machines,
  wherein the storage system configuration information comprises storage system port information for access between the virtual machines and the first site, and backup volume information indicative of location of backup data.

5. The method of claim 4, further comprising, for a request to restore from the second site to the first site:
  generating, at the second cloud-based site, backup virtual machines from the transmitted virtual machine snapshots according to the mapping and facilitating port access to the virtual machines according to the port information;
  generating, at the second storage system, backup storage volumes from the transmitted storage volumes based on the backup volume information and facilitating port access between the first site and the second storage system according to the storage system port information; and attaching the backup virtual machines to the backup storage volumes at the second storage system.

6. The method of claim 1, further comprising referring to a storage system serial number associated with a disaster recovery group of the first storage system to identify the second storage system at the second site,
  wherein the transmitting, from the first site, storage volumes of the first storage system of the first site and storage system configuration information of the first storage system of the first site is to the identified second storage system of the second site.

7. A non-transitory computer readable medium, storing instructions for facilitating backup and restore between a first site and a second site, the instructions comprising:
  transmitting, from the first site, virtual machine snapshots of a first cloud-based site and a virtual machine configuration information of the first cloud-based site to a second cloud-based site of the second site;
  transmitting, from the first site, storage volumes of a first storage system of the first site and storage system configuration information of the first storage system of the first site to a second storage system of the second site, and
  for restoration of the first site:
    generating, at the second cloud-based site, backup virtual machines from the transmitted virtual machine snapshots according to the virtual machine configuration information received from the first site; and
    generating, at the second storage system, backup storage volumes from the transmitted storage volumes according to the storage system configuration information from the first site.

8. The non-transitory computer readable medium of claim 7, the instructions further comprising attaching the backup virtual machines to the backup storage volumes at the second storage system.

9. The non-transitory computer readable medium of claim 8, the instructions further comprising providing a hostname from a domain name server to the first site, wherein the attaching the backup virtual machines to the backup storage volumes of the second storage system is conducted through the provided hostname.

10. The non-transitory computer readable medium of claim 7, wherein the virtual machine configuration information comprises a mapping between virtual machines and root devices, and port information for access to the virtual machines,
  wherein the storage system configuration information comprises storage system port information for access between the virtual machines and the first site, and backup volume information indicative of location of backup data.

11. The non-transitory computer readable medium of claim 10, the instructions further comprising, for a request to restore from the second site to the first site:
  generating, at the second cloud-based site, backup virtual machines from the transmitted virtual machine snapshots according to the mapping and facilitating port access to the virtual machines according to the port information;
  generating, at the second storage system, backup storage volumes from the transmitted storage volumes based on the backup volume information and facilitating port access between the first site and the second storage system according to the storage system port information; and attaching the backup virtual machines to the backup storage volumes at the second storage system.

12. The non-transitory computer readable medium of claim 7, the instructions further comprising referring to a storage system serial number associated with a disaster recovery group of the first storage system to identify the second storage system at the second site,
  wherein the transmitting, from the first site, storage volumes of the first storage system of the first site and storage system configuration information of the first storage system of the first site is to the identified second storage system of the second site.

13. An apparatus, configured to facilitate backup and restore between a first site and a second site, the apparatus comprising:
  a processor, configured to:
    transmit, from the first site, virtual machine snapshots of a first cloud-based site and a virtual machine configuration information of the first cloud-based site to a second cloud-based site of the second site;
    transmit, from the first site, storage volumes of a first storage system of the first site and storage system configuration information of the first storage system of the first site to a second storage system of the second site; and for restoration of the first site:
  generate, at the second cloud-based site, backup virtual machines from the transmitted virtual machine snapshots according to the virtual machine configuration information received from the first site; and
  generate, at the second storage system, backup storage volumes from the transmitted storage volumes according to the storage system configuration information from the first site.

\* \* \* \* \*